United States Patent
Elluru et al.

(10) Patent No.: US 12,309,075 B2
(45) Date of Patent: May 20, 2025

(54) CREDIT-BASED NETWORK MANAGEMENT SERVICE MESSAGING

(71) Applicant: Hewlett Packard Enterprise Development LP, Spring, TX (US)

(72) Inventors: Krishna Mohan Elluru, Karnataka (IN); Balaji Sankaran, Karnataka (IN); Suresh Rukmangathan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/408,772

(22) Filed: Jan. 10, 2024

(65) Prior Publication Data

US 2025/0133031 A1    Apr. 24, 2025

(30) Foreign Application Priority Data

Oct. 19, 2023    (IN) .............................. 202341071631

(51) Int. Cl.
*G06F 15/173* (2006.01)
*H04L 41/34* (2022.01)
*H04L 47/10* (2022.01)

(52) U.S. Cl.
CPC .............. *H04L 47/39* (2013.01); *H04L 41/34* (2022.05)

(58) Field of Classification Search
CPC ................................ H04L 47/39; H04L 41/34
See application file for complete search history.

(56) References Cited

U.S. PATENT DOCUMENTS

| | | | |
|---|---|---|---|
| 7,410,422 B2 | 8/2008 | Fine | |
| 8,751,295 B2 | 6/2014 | Tiku et al. | |
| 9,576,294 B2 | 2/2017 | Gebb et al. | |
| 9,754,443 B2 | 9/2017 | Hedrick et al. | |
| 9,811,236 B2 | 11/2017 | Hilbert et al. | |
| 9,934,537 B2 | 4/2018 | Berland et al. | |
| 10,423,109 B2 | 9/2019 | Shipman et al. | |
| 2012/0011013 A1 | 1/2012 | Vanderland et al. | |
| 2013/0185173 A1 | 7/2013 | Zheng et al. | |
| 2014/0058815 A1 | 2/2014 | Hiremath et al. | |
| 2018/0287954 A1* | 10/2018 | Dinan | H04L 47/6265 |

OTHER PUBLICATIONS

Cisco, "Meraki Co-Termination Licensing Overview", available online at <https://documentation.meraki.com/General_Administration/Licensing/Meraki_Co-Termination_Licensing_Overview>, Feb. 2, 2024, 17 pages.

(Continued)

*Primary Examiner* — Joseph R Maniwang
(74) *Attorney, Agent, or Firm* — Hewlett Packard Enterprise Patent Department

(57) ABSTRACT

A network management service controls the flow of messages (e.g., management messages) with a credit-based system. The network management service may be a cloud-based network management service. A message credit quantity for a managed network device is calculated by the network management service based on multiple criteria. The message credit quantity is communicated to the managed network device. The managed network device limits its sending of management messages to the network management service based on its assigned quantity of message credits.

20 Claims, 6 Drawing Sheets

(56) References Cited

OTHER PUBLICATIONS

Cisco, "Meraki Licensing", available online at <https://documentation.meraki.com/General_Administration/Licensing/Meraki_Licensing>, Oct. 11, 2023, 6 pages.
Juniper, "Juniper Mist Wired Assurance—subscrip . . . -S-C4-3—Network Management—CDW", available online at <https://www.cdw.com/product/juniper-mist-wired-assurance-subscription-license-3-years-1-license/6627291>, 2007, 3 pages.
Juniper, "Subscriptions and Activations", available online at <https://www.mist.com/documentation/subscriptions-and-activations/>, Mar. 21, 2022, 12 pages.

* cited by examiner

CREDIT-BASED NETWORK MANAGEMENT SERVICE MESSAGING

BACKGROUND

A network management service is used to maintain and secure a network. Specifically, a network management service allows for the management of network devices. A network management service collects data from the network devices and provides a central point of control for the network devices. Additionally, a network management service may help identify network issues. Further yet, a network management service may be used to monitor network resources and security. Network management services may be cloud-based, thereby allowing a network administrator to remotely configure, monitor, and troubleshoot their network.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
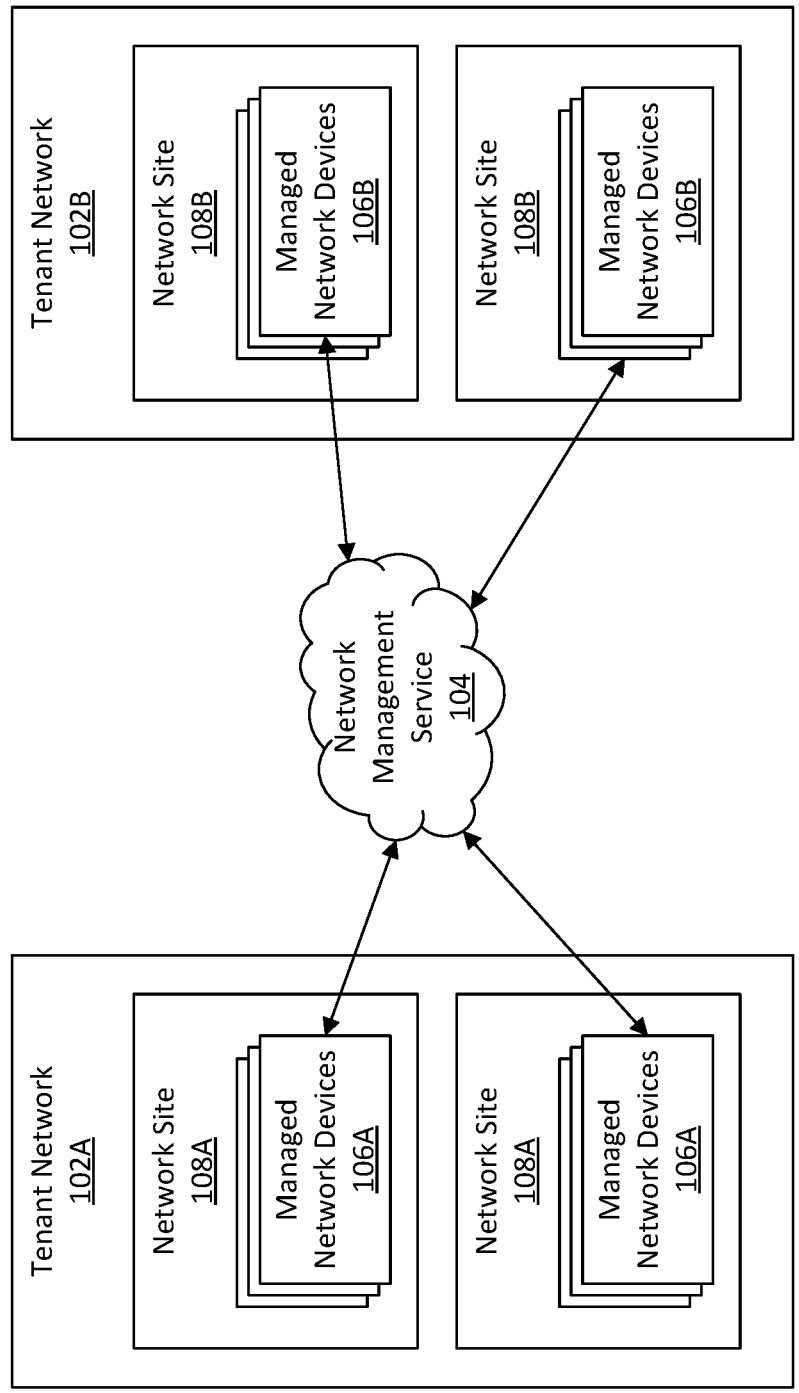
FIG. 1 is a block diagram of a network management system, according to some implementations.

The following disclosure provides many different examples for implementing different features. Specific examples of components and arrangements are described below to simplify the present disclosure. These are, of course, merely examples and are not intended to be limiting.

A network management service may be used to manage network devices for different tenants. The managed network devices provide management data (e.g., telemetry, events, status, configuration management, etc.) to the network management service via management messages. The volume of management messages sent by a managed network device depends on how the device is operated. Additionally, the network management service may be a central network management service running in a public network that is accessed by the tenants.

The network management service may be a cloud-based network management service. As a result, a small number of network devices generating a large volume of management messages may reduce the performance of the network management service for the tenants. For example, a misconfigured network device may flood the network management service with management messages, which may deteriorate or even bring down the network management service.

The present disclosure describes a network management service that controls the flow of messages (e.g., management messages) with a credit-based system. A message credit quantity for a managed network device is calculated by the network management service based on multiple criteria. The criteria may include the device type of the managed network device and the client quantity of the managed network device. Other criteria may also be utilized.

The message credit quantity is communicated to the managed network device, such as during an initialization process for the managed network device. The managed network device limits its sending of management messages to the network management service based on its assigned quantity of message credits. The network management service periodically recalculates the managed network device's message credit quantity and communicates that updated message credit quantity to the managed network device. By limiting the sending of management messages at the managed network device, the risk of the network management service being flooded with management messages by a small number of network devices may be decreased. Fairness of message processing for the tenants may thus be increased.

In an example implementation, the recalculation of the message credit quantity is based on the load of the network management service. The message credits made available to the managed network devices may be dynamically increased/decreased. For example, if the network management service becomes overloaded and falls behind in processing messages, it may decrease the message credits made available to the managed network devices so that it may reduce the number of incoming messages, thereby allowing the network management service to catch up in processing existing messages. The recalculation of the message credit quantity may also be based on other criteria, such as a licensing model or licensing agreement with a particular tenant.

FIG. 1 is a block diagram of a network management system 100, according to some implementations. The network management system 100 includes multiple tenant networks 102 (including a first tenant network 102A and a second tenant network 102B) and a network management service 104. The network management service 104 manages network devices and/or deployments of multiple tenants (or customers). The network management service 104 may run in a publicly accessible computer network, such as a cloud network, that is accessible by the tenant networks 102 and by network administrators. The network management system 100 may be an edge-to-cloud platform, in which tenant devices may be centrally managed from a cloud platform.

The tenant networks 102 include network devices 106 (including first network devices 106A and second network devices 106B for, respectively, the first tenant network 102A and the second tenant network 102B). The network devices 106 of a tenant network 102 form a transport network that provides connectivity and routing between host servers of the tenant network 102. Examples of the network devices 106 include switches, wireless access points, routers, gateways, and the like. The network devices 106 may be used to provide wired and/or wireless local area networks, wide area networks, virtual private networks, or the like. The tenant networks 102 may have any suitable topology for the network devices 106. For example, a tenant network 102 may have a campus network topology, a branch network topology, a remote network topology, a data center (DC) network topology, or the like.

The network devices 106 may be located in different network sites 108 (including first network sites 108A and second network sites 108B for, respectively, the first network devices 106A and the second network devices 106B). The network devices 106 of the different network sites 108 may all communicate with the same network management service 104, such as via a wide-area network (WAN).

The network management service 104 is adapted to manage the network devices 106. For example, the network management service 104 may be a central point of control that is accessible by network administrators of the tenant networks 102. A network administrator of a tenant network 102 may access the network management service 104 and use it to control the network devices 106 of that tenant network 102. Suitable authentication and authorization techniques may be used to limit access to the appropriate network administrator(s) of the respective tenant networks 102. For example, a first network administrator of the first tenant network 102A may be permitted to control the first network devices 106A via the network management service 104, while a second network administrator of the second tenant network 102B may be permitted to control the second network devices 106B via the network management service 104.

The network management service 104 may be used to streamline network administration operations for the tenant networks 102. For example, the network management service 104 may perform provisioning, onboarding, and configuration management of the network devices 106. Thus, the network devices 106 are managed network devices. Additionally, the network management service 104 may be used to provide network insights, visibility, troubleshooting, and the like for network administrators.

The network management service 104 may be in a different network than each of the network devices 106. In some implementations, the network management service 104 is run in a publicly accessible computer network, such as a cloud network, by a network management provider, while the tenant networks 102 may be privately accessible computer networks operated by tenants of the network management provider. For example, while the network management service 104 may provide a central point of control for each tenant network 102, tenants' data is still kept on-site at their tenant networks 102.

The network devices 106 of the tenant networks 102 connect to the network management service 104 to provide management data, which the network management service 104 uses to manage the network devices 106. The management data may include telemetry, events, status, configuration management, other critical information, and the like. The management data may be sent from the network devices 106 to the network management service 104 via management messages.

As subsequently described in greater detail, the network management service 104 utilizes a credit-based system to control the exchange of management messages between the network devices 106 and the network management service 104. A rogue network device 106 or a bad network event at a tenant network 102 may cause a small number of network devices 106 to flood the network management service 104 with a large volume of management messages. The credit-based system polices the flow of management messages and limits the amount of management messages that a network device 106 can send to the network management service 104 for processing. Thus, the amount of data that a network device 106 can send to the network management service 104 for processing may be controlled.

Figure 2:
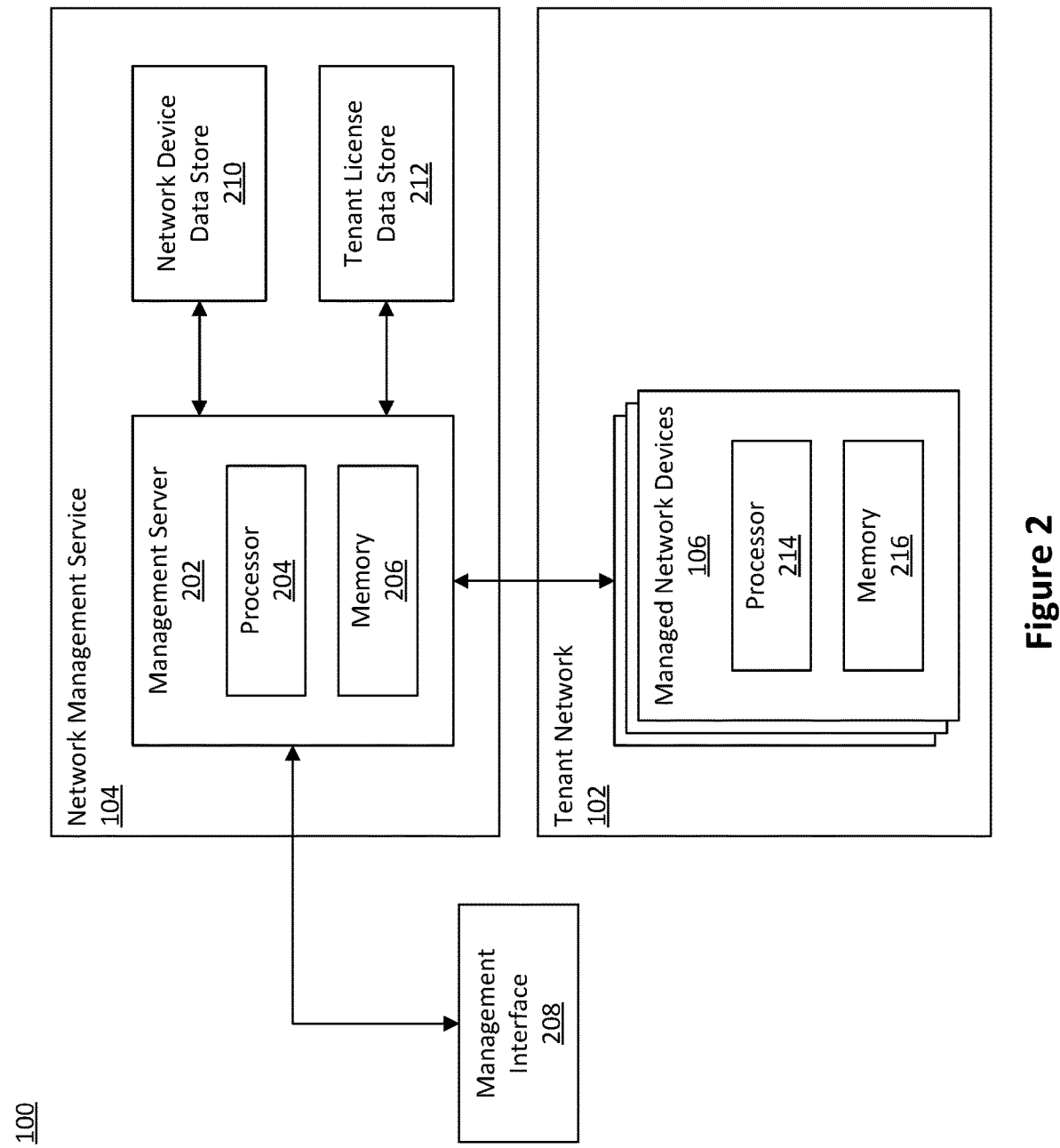
FIG. 2 is a block diagram of the network management system, according to some implementations.

FIG. 2 is a block diagram of the network management system 100, according to some implementations. Additional details of the network management system 100, including details of the network management service 104 and a network device 106, are shown. Only one tenant network 102 is shown for illustration clarity.

The network management service 104 includes a network management server 202. The network management server 202 is adapted to control the network devices 106. For example, the network management server 202 may send control messages to a network device 106, indicating a quantity of message credits available to the network device 106, and may receive management messages from the network device 106. When the network management service 104 is described herein as performing an operation, the steps of that operation may be performed at least in part by the network management server 202.

The network management server 202 may include any suitable components. Suitable components include a processor, an application-specific integrated circuit, a microcontroller, memory, and the like. The network management server 202 may be a physical computing device. For example, the network management server 202 may include a processor 204 and a memory 206. The memory 206 may be a non-transitory computer readable medium that stores programming for execution by the processor 204. One or more modules within the network management server 202 may be partially or wholly embodied as software and/or hardware for performing any functionality described herein. For example, they may be embodied as software, which is deployed to a physical device using a suitable containerization technique. In some implementations, the network management server 202 is part of a computing cluster, on which containers are deployed.

The network management system 100 may further include a management interface 208, which may be used to control the network management service 104. A network administrator may access the network management server 202 using the management interface 208. The management interface 208 may be a central point of access for the network management server 202, which is accessible from a public computer network such as the internet. The network management server 202 may receive commands via the management interface 208. The network management server 202 may process the commands from the management interface 208, validate the commands, and execute logic specified by the commands. Further, the network management server 202 may output the results of commands via the management interface 208. Examples of the management interface 208 include a command line interface, a graphical user interface, a web interface, or the like.

The network management server 202 may further include a network device data store 210 and/or a tenant license data store 212. The network device data store 210 may store information about the deployment and configuration of the network devices 106 within the tenant networks 102. Examples of information for a network device 106 includes the device configuration, the device type, the scale of clients, the location of the network device 106 in the topology of a tenant network 102, and the like. The tenant license data store 212 may store licensing information for the tenants who operate the tenant networks 102. Examples of licensing information for a tenant includes the number of devices licensed by the tenant, the licensing model for the tenant, any additional message credits licensed by the tenant, and the like.

The network device data store 210 and/or the tenant license data store 212 may be implemented with a database, such as a relational database, a key-value store, or the like.

In some implementations, the network device data store 210 and the tenant license data store 212 are both part of the same database. For example, the network device data store 210 and the tenant license data store 212 may include different table(s) of the same database.

Each network device 106 may include any suitable components. Suitable components include a processor, an application-specific integrated circuit, a microcontroller, memory, and the like. A network device 106 may be a physical computing device. For example, a network device 106 may include a processor 214 and a memory 216. The memory 216 may be a non-transitory computer readable medium that stores programming for execution by the processor 214. One or more modules within a network device 106 may be partially or wholly embodied as software and/or hardware for performing any functionality described herein.

As previously noted, the network management service 104 utilizes a credit-based system to control the exchange of management messages between the network devices 106 and the network management service 104. The network management service 104 calculates, for a network device 106, the number of message credits that are available based on several criteria (subsequently described). The number of message credits for a network device 106 may then be communicated to the network device 106, and the network device 106 may then limit its exchange of management messages based on its number of message credits.

In some implementations, a message credit is a data rate for management messages, such that the number of message credits indicates the total rate at which management messages may be sent from a network device 106 to the network management service 104. The number of message credits may be an integer multiple of a base data rate. For example, if the base data rate is 64 Kbps, then the number of message credits being two indicates the network device 106 may send management messages to the network management service 104 at a rate of up to 128 Kbps. The base data rate may be predetermined or configurable.

The network management service 104 may calculate the number of available message credits at the tenant level. Specifically, based on the number of network devices 106 deployed by a tenant, the network management service 104 may calculate the number of message credits available to the tenant network 102 as a whole. The number of message credits for the tenant network 102 may then be divided across the network devices 106 of the tenant network 102. The number of message credits allocated to a network device 106 may be based on one or more parameters (subsequently described). The parameters may be stored in the network device data store 210 and/or in the tenant license data store 212.

The number of message credits allocated to a network device 106 may be based at least partially on the device type of the network device 106. For example, the number of message credits may be based on whether the network device 106 is a switch, access point, router, gateway, or the like. Certain types of network devices 106 may be allocated more message credits than other types of network devices 106.

The number of message credits allocated to a network device 106 may be based at least partially on the client quantity of the network device 106. For example, the number of message credits may be scaled based on the quantity of clients served by the network device 106. A network device 106 with a small number of clients may be allocated fewer message credits than a network device 106 with a large number of clients.

The number of message credits allocated to a network device 106 may be based at least partially on the location of the network device 106 in the topology of a tenant network 102. For example, when the network device 106 is a switch, the number of message credits may be based on whether the switch is an upper-tier switch (e.g., a spine switch, a core switch, or an aggregator switch) having a large quantity of network links, or a lower-tier switch (e.g., a leaf switch or an access switch) having a small quantity of network links. A network device 106 with a large quantity of network links may be allocated more message credits than a network device 106 with a small quantity of network links.

The number of message credits allocated to a network device 106 may be based at least partially on the geographic location of the network device 106, as well as the local time in that geographic location. The expected load of the network management service 104 at a given local time for a network device 106 may also be considered. A network device 106 may be allocated more message credits during daytime in its locale and fewer message credits during nighttime in its locale. For example, a first network device 106 in a first geographic location may be allocated more message credits than a second network device 106 in a second geographic location when it is daytime in the first geographic location and nighttime in the second geographic location. Continuing that example, the first network device 106 may be allocated fewer message credits than the second network device 106 when it is nighttime in the first geographic location and daytime in the second geographic location.

The number of message credits allocated to a network device 106 may be based at least partially on the historic utilization of message credits by the network device 106. For example, a network device 106 that historically underutilizes its message credits may be allocated fewer message credits in the future. Similarly, a network device 106 that historically utilizes all of its allocated message credits may be allocated more message credits in the future.

The number of message credits allocated to a network device 106 may be based at least partially on the licensing information of the network device 106. For example, a network device 106 may be configured with a licensing model that determines where more/fewer message credits are allocated to the network device 106. Similarly, a network device 106 may be allocated additional message credits if the tenant for the network device 106 has licensed additional message credits. A tenant may purchase additional message credits for their network/devices (thus allowing the messaging rate of their network/devices to be increased) on a pay-as-you-go basis.

Once the number of message credits for a network device 106 is calculated, the number of message credits is communicated to the network device 106, such as during an initial handshake and/or onboarding process for the network device 106. For example, the number of message credits may be sent to the network device 106 via https when the network device 106 initially connects to the network management service 104. During this initialization process, the network management service 104 provides the number of message credits that network device 106 may use to the network device 106.

After receiving its number of message credits, a network device 106 sends management messages to the network management service 104 based on its number of message credits. For example, when the number of message credits indicates a data rate, the network device 106 may send management messages to the network management service 104 at a data rate that is less than or equal to the data rate indicated by the number of message credits. The network device 106, before sending information to the network management service 104, confirms that sufficient message credits are available. The network management service 104 may drop management messages from a network device 106 that are in excess of the number of message credits available to that network device 106. This allows the network management service 104 to provide fair weighting to the network devices 106 in processing their information. If the message credits for a network device 106 are exhausted, then the network device 106 will stop sending information to the network management service 104. In such a situation, the network device 106 may coalesce management messages that would be in excess of its number of message credits, and then send the coalesced messages to the network management service 104 when more message credits are made available to the network device 106.

During operation, the network management service 104 may update the number of message credits available to a network device 106. The network management service 104 may send a credit update message to the network device 106, indicating the updated number of message credits available to the network device 106. The credit update message may also indicate the number of message credits currently consumed by the network device 106.

In some implementations, the credit update message is periodically sent to the network device 106. For example, the credit update message may be included with a keep-alive message that is sent to the network device 106 after initialization of a network device 106. The keep-alive message may be sent to the network device 106 every, e.g., three seconds. The periodicity of the credit update message may be predetermined or configurable. In some implementations, the credit update message is aperiodically sent to the network device 106. For example, the credit update message may be included with an out-of-band message that is sent to the network device 106 independently of keep-alive messages.

The network management service 104 may used the credit-based system to dynamically adjust the rate at which it processes information from the network devices 106. Upon processing the information received in management messages, the network management service 104 may update the number of message credits available to the network devices 106. Specifically, the number of message credits available to a network device 106 may be recalculated based on a load of the network management service 104. If the network management service 104 becomes overloaded with management messages and falls behind in processing management messages, it may decrease the message credits made available to the network device 106. The updated (e.g., decreased) number of message credits available to the network device 106 may then be communicated to the network device 106, as previously described. In this manner, the network management service 104 may temporarily reduce the number of incoming messages from the network device 106, allowing the network management service 104 more resources to process existing messages.

The network management service 104 may update the number of message credits available to a network device 106 based on other considerations. In some implementations, the network management service 104 may temporarily grant a network device 106 additional message credits. For example, a network management provider that operates the network management service 104 may, via the management interface 208, instruct the network management service 104 to grant additional message credits to a network device 106. Such a temporary message credit increase may be performed when a network device 106 is under testing or troubleshooting.

As previously noted, the number of message credits may be calculated for a tenant network 102 and then be divided across the network devices 106 of the tenant network 102. When the tenant network 102 is changed (such as due to the addition or removal of a network device 106), the number of message credits for each network device 106 of the tenant network 102 may be recalculated using the previously described criteria. The updated number of message credits may then be communicated to each network device 106 via a credit update message.

There may be multiple types of management data (e.g., telemetry, events, status, configuration management) in the management messages sent by the network device 106 to the network management service 104. For example, the management data may include basic management data and advanced management data. The basic management data may be data related to basic services for the network device 106. For example, when a network device 106 is a switch, the basic management data may include system details, interface health, and hardware health of the switch. The advanced management data may be data related to advanced or value-add services for the network device 106. For example, the advanced management data may be additional hardware/operational data used to provide additional insight to the operation of a network device 106.

A network device 106 may not be able to operate without exchanging basic management data with the network management service 104, but may be able to operate even if it is unable to exchange advanced management data with the network management service 104. In some implementations, the network management service 104 provides the network device 106 a sufficient number of message credits to ensure basic management data may be exchanged with the network management service 104. As subsequently described, a network device 106 may prioritize the transmission of basic management data over advanced management data. In this manner, basic services for the network device 106 may continue operating while advanced or value-add services for the network device 106 may be deprioritized when the network device 106 lacks sufficient message credits.

Figure 3:
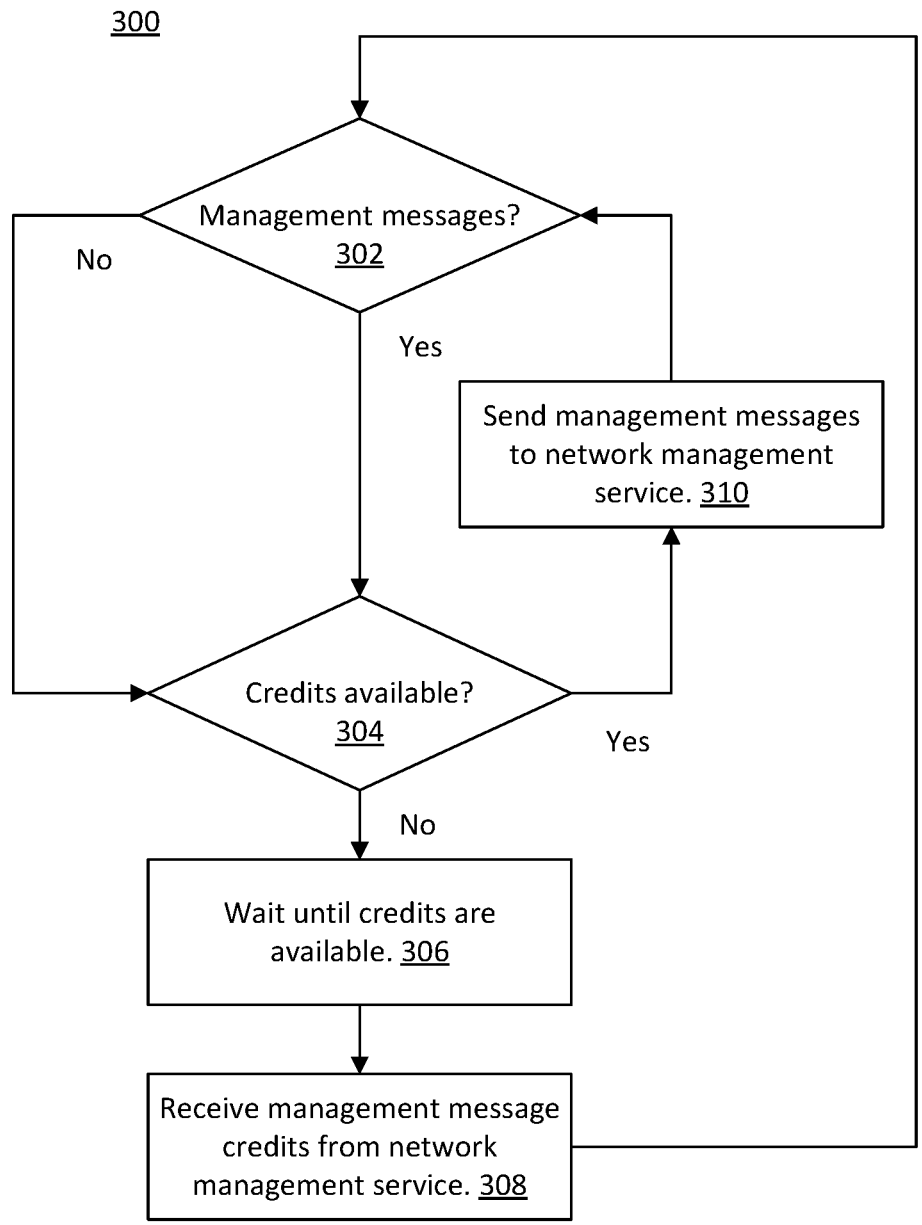
FIG. 3 is a flow diagram of a network management service messaging method, according to some implementations.

FIG. 3 is a flow diagram of a network management service messaging method 300, according to some implementations. The network management service messaging method 300 will be described in conjunction with FIG. 2. The network management service messaging method 300 may be performed by a network device 106 when sending management messages to the network management service 104. The network device 106 limits its sending of management messages according to the message credits made available to it. Limiting the sending of messages at a network device 106 may improve the efficiency of the network management system 100, as less data may traverse the network before being dropped at the network management service 104.

The network device 106 performs a step 302 of determining whether management messages are ready for transmission to the network management service 104. Management messages may be ready when the network device 106 has collected management data that is ready to be reported to the network management service 104. The management data may be basic management data or advanced management data.

The network device 106 performs a step 304 of determining whether sufficient message credits are available to send management messages, in response to determining the management messages are ready for transmission. The network device 106 tracks its current number of message credits, and will update that tracked number when message credits are received/used. The tracked number may be evaluated to determine whether sufficient message credits are available.

The network device 106 performs a step 306 of waiting until more message credits are available, in response to insufficient message credits being available. In implementations where the message credits are a data rate, message credits may be available when the current data rate of the network device 106 is less than or equal to the data rate permitted by its message credits. For example, the network device 106 may evaluate the size of the management messages sent (in step 310, subsequently discussed) over time in order to determine the current data rate of message transmission. If the current data rate of the network device 106 exceeds the data rate permitted by its message credits, then the network device 106 waits until the current data rate no longer exceeds the permitted data rate.

The network device 106 performs a step 308 of receiving message credits from the network management service 104. The message credits may be received by receiving an initial number of message credits from the network management service 104 during an initialization process for the network device 106. Alternatively, the message credits may be received by receiving a credit update message from the network management service 104 during operation. In either case, the network device 106 is informed of the number of message credits it has available. The tracked number of message credits may be updated upon receiving the message credits from the network management service 104.

The network device 106 performs a step 310 of sending the management messages to the network management service 104, in response to sufficient message credits being available. The tracked number of message credits is updated based on the transmission of the management messages. For example, the tracked number of message credits may be decremented by the amount of message credits that were consumed by the transmission of the management messages to the network management service 104.

Figure 4:
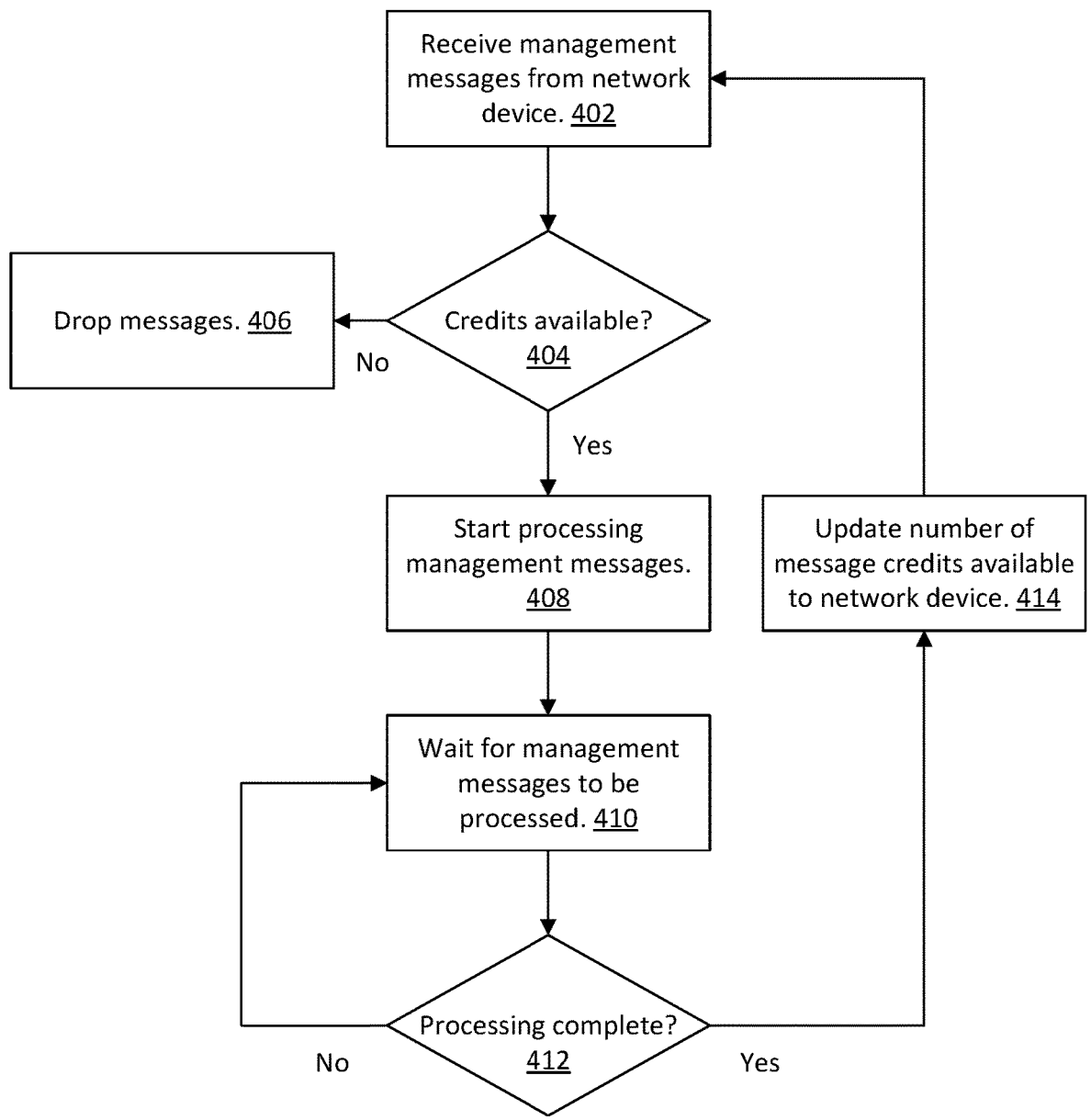
FIG. 4 is a flow diagram of a network device messaging method, according to some implementations.

FIG. 4 is a flow diagram of a network device messaging method 400, according to some implementations. The network device messaging method 400 will be described in conjunction with FIG. 2. The network device messaging method 400 may be performed by a network management service 104 when receiving management messages from a network device 106.

The network management service 104 performs a step 402 of receiving management messages from the network device 106. The network management service 104 then performs a step 404 of determining whether the network device 106 has sufficient message credits available to process the received messages. In implementations where the message credits are a data rate, message credits may be available when the current data rate of the network device 106 is less than or equal to the data rate permitted by its message credits.

The network management service 104 performs a step 406 of dropping messages, in response to insufficient message credits being available to the network device 106. The dropped messages may be messages with a low priority, and may be the received management messages or may be messages other than the received management messages. For example, management messages that contain advanced management data (e.g., data related to advanced or value-add services) may be low priority messages that are dropped. However, management messages that contain basic management data (e.g., data related to basic services) may be high priority messages that are not dropped.

The network management service 104 performs a step 408 of starting the processing the management messages, in response to sufficient message credits being available to the network device 106. For example, the network device data store 210 may be updated based on the management messages. The number of message credits available to the network device 106 is updated based on the processing of the management messages. For example, the message credits available to the network device 106 may be decremented by the amount of message credits that were consumed by the processing of the management messages from the network device 106.

The network management service 104 performs a step 410 of waiting for the management messages from the network device 106 to be processed. Next, the network management service 104 performs a step 412 of determining if the processing of the management messages is complete. The network management service 104 may repeat the step 410 of waiting until processing is complete.

The network management service 104 performs a step 414 of updating the number of message credits available to the network device 106, in response to determining the processing of the management messages was complete. The number of message credits available to the network device 106 may be recalculated based on a load of the network management service 104, a historic utilization of message credits by the network device 106, or the like. For example, the network management service 104 may increase or decrease the number of message credits available to the network device 106 in order to dynamically adjust the amount of information that is processed by the network management service 104. The network management service 104 may communicate the updated number of message credits to the network device 106, such as by sending a credit update message to the network device 106.

The network management service 104 may optionally perform additional steps. For example, when processing management messages from the network device 106 in step 408, the network management service 104 may determine whether the network device 106 is misconfigured. The historic utilization of message credits by the network device 106 may be evaluated to determine if the network device 106 is misconfigured. The network management service 104 may identify a misconfiguration of the network device 106 by comparing a volume of the management messages from the network device 106 to the message credits for the network device. The historic utilization indicating that the network device 106 is suboptimally utilizing (e.g., consistently over utilizing or underutilizing) message credits may suggest the network device 106 is misconfigured or that credit allocation is incorrect. The network administrator of the network device 106 may be notified that message credit utilization by the network device 106 is suboptimal.

Some variations are contemplated. In some implementations, the received management messages may not be dropped (in step 406) in response to insufficient message credits being available to the network device 106. The management messages may still be processed (in steps 408-412) notwithstanding the lack of message credits. Going forward, the number of message credits available to the network device 106 may be temporarily decreased (in step 414) to compensate for the processing of message credits in excess of the available message credits.

Figure 5:
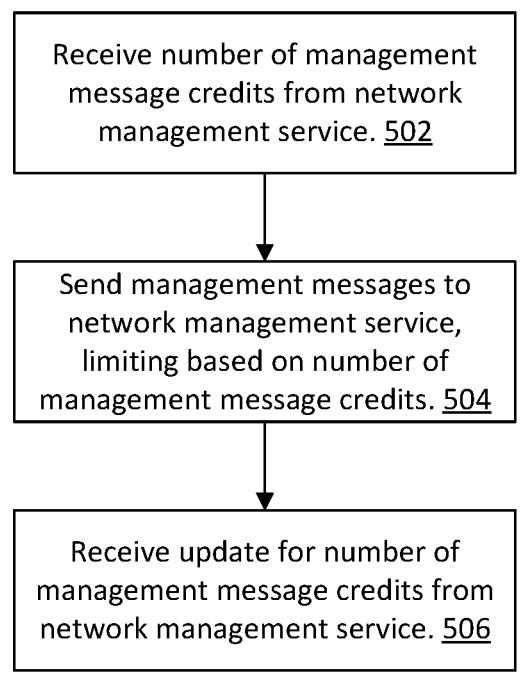
FIG. 5 is a flow diagram of a network device credit update method, according to some implementations.

FIG. 5 is a flow diagram of a network device credit update method 500, according to some implementations. The network device credit update method 500 will be described in conjunction with FIG. 2. The network device credit update method 500 may be performed by a network device 106 as part of updating the number of message credits for the network device 106.

The network device 106 performs a step 502 of receiving a number of management message credits from a network management service 104. As previously noted, the network management service 104 is in a different network than the network device 106. For example, the network management service 104 may be in a publicly accessible network, while the network device 106 is in a tenant network 102. In some implementations, the management message credits indicate a permitted data rate for the sending of the management messages to the network management service 104.

The network device 106 performs a step 504 of sending management messages to the network management service 104. The sending of the management messages is limited, by the network device 106, based on the number of its management message credits. The message limiting is performed locally at the network device 106, which may reduce the risk of messages traversing a network before being dropped at the network management service 104. In some implementations where the management message credits indicate a permitted data rate, the data rate during the sending of the management messages is limited by the permitted data rate. If management messages would be sent in excess of the number of management message credits, then the network device 106 may not send those management messages immediately, but instead may coalesce the management messages until the management message credits are replenished.

The network device 106 performs a step 506 of receiving an update for the number of management message credits from the network management service 104. The update may be in a credit update message, which may be received as part of, e.g., a keep-alive message for the network device 106, an out-of-band message for the network device 106, or the like. The updated number of management message credits may be different (e.g., greater or less) than the previous number of management message credits.

Figure 6:
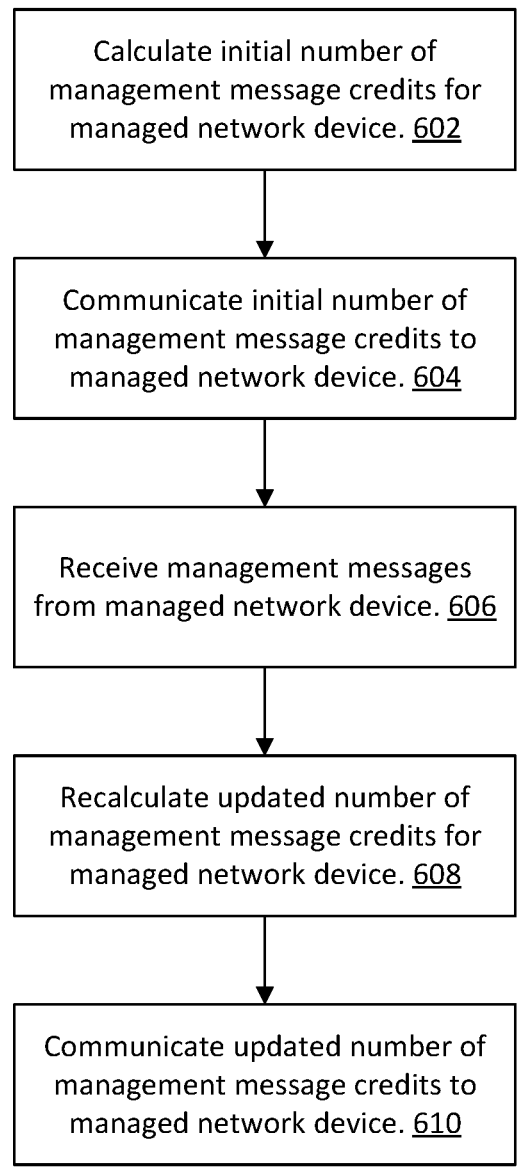
FIG. 6 is a flow diagram of a management service credit update method, according to some implementations.

FIG. 6 is a flow diagram of a management service credit update method 600, according to some implementations. The management service credit update method 600 will be described in conjunction with FIG. 2. The management service credit update method 600 may be performed by a network management service 104 as part of updating the number of message credits for a network device 106.

The network management service 104 performs a step 602 of calculating an initial number of management message credits for a managed network device 106. The calculation may be based on a device type of the managed network device 106 and a client quantity of the managed network device 106. Additionally or alternatively, the calculation may also be based on other criteria (previously described). For example, the calculation may also be based on a location of the managed network device 106 in a topology of a tenant network 102. Similarly, the calculation may also be based on a geographic location of the managed network device 106 and a local time in that geographic location.

The network management service 104 performs a step 604 of communicating the initial number of the management message credits to the managed network device. This may be performed during an initial handshake and/or onboarding process for the managed network device 106.

The network management service 104 performs a step 606 of receiving management messages from the managed network device 106. The managed network device 106 may send the management messages, and limit its sending of those management messages based on the initial number of its management message credits that was communicated to the managed network device 106.

The network management service 104 performs a step 608 of recalculating an updated number of the management message credits for the managed network device 106, in response to receiving the management messages from the managed network device 106. The recalculation is based on a load of the network management service 104. For example, the network management service 104 may dynamically decrease the initial number of the management message credits for the managed network device 106 in response to the network management service 104 being overloaded. The network management service 104 may be overloaded when its load (e.g., quantity of messages to process) exceeds a predetermined threshold.

The network management service 104 performs a step 610 of communicating the updated number of the management message credits to the managed network device 106. In some implementations, the network management service 104 sends a credit update message to the managed network device periodically. For example, the network management service 104 may send a keep-alive message to the managed network device 106, where the keep-alive message includes the credit update message. In some implementations, the network management service 104 sends a credit update message to the managed network device aperiodically. For example, the network management service 104 may send an out-of-band message to the managed network device 106, where the out-of-band message includes the credit update message.

Some variations are contemplated. In some implementations, multiple credit-based system may be operated in parallel. As previously noted, the management data in the management messages may include basic management data and advanced management data. A first credit-based system may be utilized to control the exchange of basic management messages (including basic management data), while a second credit-based system may be utilized to control the exchange of advanced management messages (including advanced management data). Thus, the network management service 104 may calculate, and a network device 106 may track, a number of basic management message credits and a number of advanced management message credits. The network device 106 may limit its sending of basic management messages based on its basic management message credits, and may limit its sending of advanced management messages based on its advanced management message credits. A network device 106 that runs out of basic management message credits may send basic management messages using advanced management message credits. When dropping management messages that are in excess of the number of message credits available to a network device 106, the network management service 104 may prefer dropping advanced management messages over dropping basic management messages.

Embodiments may achieve advantages. Using a credit-based system to control the exchange of management messages may reduce the risk of a small number of network devices 106 deteriorating or even bringing down the network management service 104 for the remaining network devices 106. Specifically, the risk of a tenant network 102 bringing down the network management service 104 such that the network management service 104 cannot manage other tenant networks 102 may be reduced. Additionally, using a credit-based system to control the exchange of management messages may help optimize the resource utilization for the network management service 104. Thus, a credit-based system may be a more cost-effective way to mitigate message flooding, as compared to horizontally scaling the network management service 104.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A network management system comprising:
   a network device comprising a processor configured to:
      track a number of management message credits for the network device; and
      send management messages based on the number of the management message credits for the network device; and
   a network management server configured to:
      receive the management messages from the network device;
      recalculate the number of the management message credits for the network device based on a load of the network management server in response to receiving the management messages from the network device; and
      communicate the number of the management message credits to the network device.

2. The network management system of claim 1, wherein the network management server recalculates the number of the management message credits for the network device in response to the network management server being overloaded with management messages.

3. The network management system of claim 1, wherein the network management server is further configured to:
   drop messages sent from the network device in excess of the number of the management message credits for the network device.

4. The network management system of claim 1, wherein the network device is configured to prioritize basic management data over advanced management data when sending management messages to the network management server.

5. The network management system of claim 1, wherein the management message credits indicate a data rate for the network device.

6. The network management system of claim 1, wherein the network management server is further configured to:
   identify a misconfiguration of the network device by comparing a volume of the management messages from the network device to the management message credits for the network device.

7. The network management system of claim 1, wherein the network management server is in a tenant network the network device is in a cloud network.

8. A network device comprising:
   a processor; and
   a non-transitory computer readable medium storing instructions which, when executed by the processor, cause the processor to:
      receive a number of management message credits from a network management service, the network management service being in a different network than the network device;
      send management messages to the network management service, the sending of the management messages being limited based on the number of the management message credits; and
      receive an update for the number of management message credits from the network management service.

9. The network device of claim 8, wherein the management message credits indicate a permitted data rate for the sending of the management messages to the network management service, and a data rate during the sending of the management messages is limited by the permitted data rate.

10. The network device of claim 8, wherein the sending of the management messages is limited by coalescing management messages in excess of the number of management message credits.

11. The network device of claim 8, wherein the update for the number of management message credits is received as part of a keep-alive message for the network device.

12. The network device of claim 8, wherein the update for the number of management message credits is received as part of an out-of-band message for the network device.

13. A method comprising:
   calculating, by a network management server, an initial number of management message credits for a managed network device based on a device type of the managed network device and a client quantity of the managed network device;
   communicating, by the network management server, the initial number of the management message credits to the managed network device;
   receiving, by the network management server, management messages from the managed network device;
   recalculating, by the network management server, an updated number of the management message credits for the managed network device based on a load of the network management server in response to receiving the management messages from the managed network device; and
   communicating, by the network management server, the updated number of the management message credits to the managed network device.

14. The method of claim 13, wherein recalculating the updated number of the management message credits comprises decreasing the initial number of the management message credits in response to the load of the network management server exceeding a threshold.

15. The method of claim 13, wherein the managed network device is part of a tenant network, and the initial number of the management message credits is also calculated based on a location of the managed network device in a topology of the tenant network.

16. The method of claim 13, wherein the initial number of the management message credits is also calculated based on a geographic location of the managed network device and a local time in the geographic location.

17. The method of claim 13, wherein communicating the updated number of the management message credits to the managed network device comprises:

sending a credit update message to the managed network device periodically.

18. The method of claim 17, wherein sending the credit update message to the managed network device comprises:

sending a keep-alive message to the managed network device.

19. The method of claim 13, wherein communicating the updated number of the management message credits to the managed network device comprises:

sending a credit update message to the managed network device aperiodically.

20. The method of claim 19, wherein sending the credit update message to the managed network device comprises:

sending an out-of-band message to the managed network device.

* * * * *